US010252693B2

United States Patent
Numazawa

(10) Patent No.: US 10,252,693 B2
(45) Date of Patent: Apr. 9, 2019

(54) AIRBAG UNIT

(71) Applicant: Fuji Jukogyo Kabushiki Kaisha, Tokyo (JP)

(72) Inventor: Koji Numazawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 64 days.

(21) Appl. No.: 15/387,358

(22) Filed: Dec. 21, 2016

(65) Prior Publication Data
US 2017/0267205 A1    Sep. 21, 2017

(30) Foreign Application Priority Data
Mar. 18, 2016 (JP) ................. 2016-055896

(51) Int. Cl.
*B60N 2/14* (2006.01)
*B60R 21/015* (2006.01)
(Continued)

(52) U.S. Cl.
CPC ........ B60R 21/23138 (2013.01); B60N 2/143 (2013.01); B60R 21/01554 (2014.10);
(Continued)

(58) Field of Classification Search
CPC ............ B60R 21/01554; B60R 21/207; B60R 21/23138; B60R 2021/0006;
(Continued)

(56) References Cited

U.S. PATENT DOCUMENTS 3,885,764 A * 5/1975 Pabreza ................... A47C 3/18
248/157
5,042,864 A * 8/1991 Mochizuki .............. B60N 2/12
248/393
(Continued)

FOREIGN PATENT DOCUMENTS

JP    H10-053091 A    2/1998
JP    2003-312341 A    11/2003
(Continued)

OTHER PUBLICATIONS

Japanese Office Action dated Jul. 25, 2017 in Japanese Application No. 2016-055896 with an English translation thereof.

*Primary Examiner* — Laura Freedman
(74) *Attorney, Agent, or Firm* — McGinn IP Law Group, PLLC

(57) ABSTRACT

An airbag unit includes a seat, a pair of side airbags, a seat state detector, and an airbag deployment controller. The seat is reversely rotatable in a front-rear direction of a vehicle. The pair of side airbags are expansive and deployable, and incorporated in the seat on respective sides of the seat in a width direction of the vehicle. The seat state detector detects a rearward-oriented state of the seat, i.e., a state in which the seat is rearward-oriented in the front-rear direction. The airbag deployment controller performs a deployment control of the pair of side airbags, on a condition that the seat state detector detects the rearward-oriented state of the seat. The airbag deployment controller performs the deployment control in a reverse sequence from a deployment control in a frontward-oriented state of the seat, i.e., a state in which the seat is frontward-oriented in the front-rear direction.

18 Claims, 6 Drawing Sheets

(51) Int. Cl.
  *B60R 21/207* (2006.01)
  *B60R 21/231* (2011.01)
  *B60N 2/02* (2006.01)
  *B60R 21/00* (2006.01)
  *B60R 21/01* (2006.01)

(52) U.S. Cl.
  CPC ...... *B60R 21/207* (2013.01); *B60N 2002/022* (2013.01); *B60R 2021/0006* (2013.01); *B60R 2021/01211* (2013.01); *B60R 2021/23146* (2013.01)

(58) Field of Classification Search
  CPC . B60R 2021/01211; B60R 2021/23146; B60R 2021/23161; B60N 2002/022; B60N 2/143
  See application file for complete search history.

(56) References Cited

U.S. PATENT DOCUMENTS

| | | | | |
|---|---|---|---|---|
| 5,499,840 | A * | 3/1996 | Nakano | B60N 2/0705 280/730.1 |
| 5,584,460 | A * | 12/1996 | Ropp | B60N 2/143 248/423 |
| 5,853,221 | A * | 12/1998 | Thoman | B60N 2/143 297/344.24 |
| 6,129,405 | A * | 10/2000 | Miyahara | B60N 2/01 296/65.03 |
| 6,186,573 | B1 * | 2/2001 | Thurab | B60N 2/143 296/65.13 |
| 9,290,151 | B2 * | 3/2016 | Fujiwara | B60R 21/231 |
| 9,409,540 | B2 * | 8/2016 | Fujiwara | B60R 21/207 |
| 9,597,983 | B2 * | 3/2017 | Strasdat | B60R 7/04 |
| 9,604,588 | B1 * | 3/2017 | Rao | B60R 21/01534 |
| 9,725,064 | B1 * | 8/2017 | Faruque | B60N 2/143 |
| 9,731,628 | B1 * | 8/2017 | Rao | B60R 21/01554 |
| 9,744,929 | B2 * | 8/2017 | Rao | B60R 21/01516 |
| 9,744,933 | B1 * | 8/2017 | Rao | B60R 21/01554 |
| 9,789,840 | B2 * | 10/2017 | Farooq | B60N 2/14 |
| 9,815,425 | B2 * | 11/2017 | Rao | B60R 21/01554 |
| 9,821,681 | B2 * | 11/2017 | Rao | B60N 2/0244 |
| 9,834,165 | B2 * | 12/2017 | Rao | B60R 21/01534 |
| 2009/0200775 | A1 * | 8/2009 | Sugimoto | B60R 21/207 280/730.2 |
| 2014/0042733 | A1 | 2/2014 | Fukawatase | |
| 2016/0272141 | A1 * | 9/2016 | Ohmura | B60R 21/01554 |
| 2017/0050538 | A1 * | 2/2017 | Akimoto | B60N 2/0244 |
| 2017/0050539 | A1 * | 2/2017 | Akimoto | B60N 2/0232 |
| 2017/0210329 | A1 * | 7/2017 | Rao | B60R 21/0136 |
| 2017/0267124 | A1 * | 9/2017 | Numazawa | B60N 2/0244 |
| 2018/0105067 | A1 * | 4/2018 | Ajisaka | B60N 2/012 |

FOREIGN PATENT DOCUMENTS

| | | | |
|---|---|---|---|
| JP | 2010012997 A * | 1/2010 | |
| JP | 2014-034356 A | 2/2014 | |

* cited by examiner

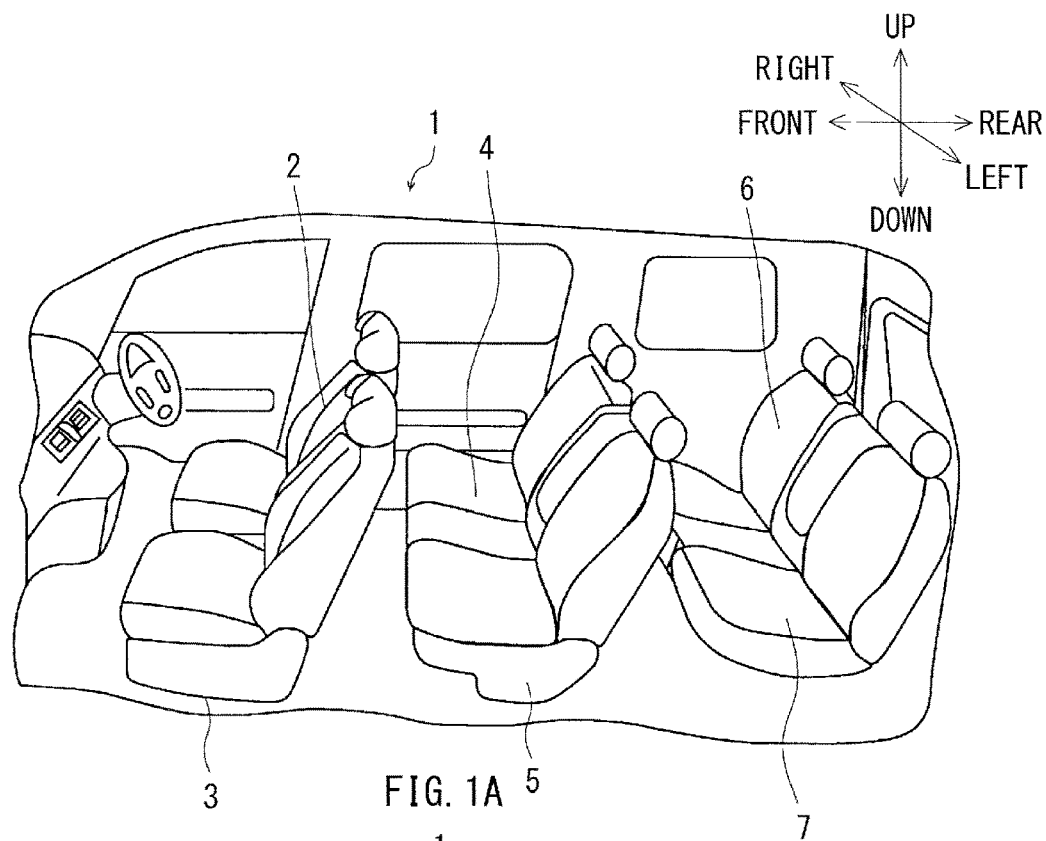
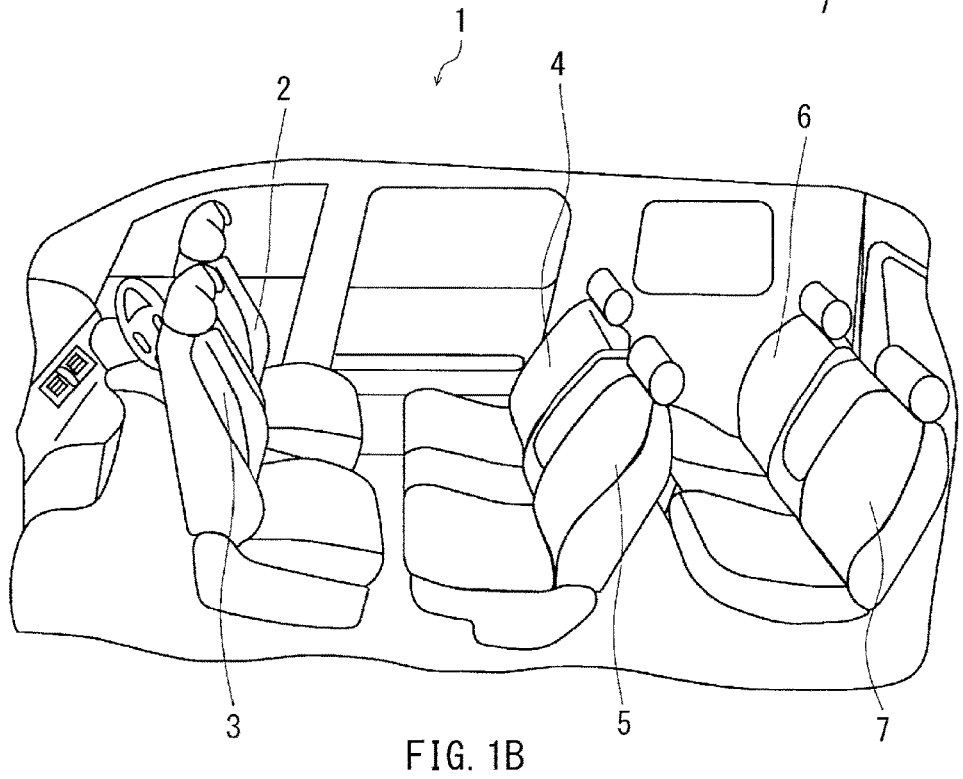
FIG. 1A
FIG. 1B

＃ AIRBAG UNIT

CROSS-REFERENCE TO RELATED APPLICATIONS

The present application claims priority from Japanese Patent Application No. 2016-055896 filed on Mar. 18, 2016, the entire contents of which are hereby incorporated by reference.

BACKGROUND

The technology relates to an airbag unit. Specifically, the technology relates to an airbag unit that provides protection for an occupant, with a method of a deployment control of a side airbag unit, even when a driver's seat or a navigator's seat is rearward-oriented in a front-rear direction.

A side airbag unit has been known as an airbag unit that provides protection for an occupant against a collision when a vehicle is collided from sideward. The side airbag unit may be incorporated in a backrest of a seat. As illustrated in FIG. 6, bucket seats 100 may be disposed in a compartment of a vehicle. The bucket seats 100 may include a driver's seat 101 and a navigator's seat 102. A pair of side airbag units 103R and 103L may be provided in the driver's seat 101, on right and left sides of the driver's seat 101. A pair of side airbag units 104R and 104L may be provided in the navigator's seat 102, on right and left sides of the navigator's seat 102. The side airbag units 103R, 103L, 104R, and 104L each may include, although undepicted, an airbag in a bag shape, an inflator, and a case. The inflator may generate gas that causes the airbag to expand. The case may accommodate the airbag and the inflator.

If a side collision should occur on side of the vehicle on which the driver's seat is disposed, the inflators of the side airbag units 103R and 104R may be selectively ignited. This causes instant gas supply from the inflators to the airbags. Hence, it is possible to protect occupants from the side collision of the vehicle, and to prevent an occupant seated on the driver's seat from colliding with an occupant seated on the navigator's seat.

The side airbag units 103R, 103L, 104R, and 104L may expand and deploy upon the occurrence of the side collision in the following order. First, a side collision sensor on right side of the vehicle may detect the side collision on the right side of the vehicle. This causes expansion and deployment of the side airbag units 103R and 104R on the right sides of the seats 101 and 102. Hence, it is possible to prevent the occupant seated on the driver's seat 101 from colliding with an inner surface of a side wall of the vehicle, and to prevent the occupant seated on the driver's seat 101 from colliding with the occupant seated on the navigator's seat 102.

Next, a rollover sensor of the vehicle may detect a rollover of the vehicle due to the side collision. This causes expansion and deployment of the side airbag units 103L and 104L on left sides of the seats 101 and 102. Hence, it is possible to prevent the occupant from colliding with an protruding object inside the compartment of the vehicle, and to prevent the occupant seated on the driver's seat 101 from colliding with the occupant seated on the navigator's seat 102. For example, reference is made to Japanese Unexamined Patent Application Publication (JP-A) No. 2003-312341.

SUMMARY

As described, when the side collision sensor on the right side of the vehicle detects the side collision on the right side of the vehicle, the side airbag units 103R and 104R on the right sides of the seats 101 and 102 may expand and deploy. Thereafter, when the rollover sensor of the vehicle detects the rollover of the vehicle due to the side collision, the side airbag units 103L and 104L on the left sides of the seats 101 and 102 may expand and deploy.

In short, the existing side airbag units 103R, 103L, 104R, and 104L give priority to the expansion and deployment of the side airbag units on side of the vehicle on which the side collision has occurred. Thus, the occupant may be protected against the collision with the inner surface of the side wall of the vehicle.

However, the existing side airbag units 103R, 103L, 104R, and 104L lack a configuration that may provide protection for the occupant on an assumption that the vehicle may run with the driver's seat 101 or the navigator's seat 102 rotated toward rear seats of the vehicle, in face-to-face relation to the rear seats.

With the driver's seat 101 or the navigator's seat 102 thus rotated toward the rear seats of the vehicle, when, for example, the side collision sensor on the right side of the vehicle detects the side collision on the right side of the vehicle, the side airbag unit 103R on the right side of the driver's seat 101 may expand and deploy. In this case, there is a disadvantage of difficulty in providing appropriate protection for the occupant against the collision with the inner surface of the side wall of the vehicle. The collision of the occupant with the inner surface of the side wall of the vehicle is considered to possibly cause severest damage to the occupant.

It is desirable to provide an airbag unit that makes it possible to provide appropriate protection for an occupant.

An aspect of the technology provides an airbag unit that includes a seat, a pair of side airbags, a seat state detector, and an airbag deployment controller. The seat is disposed in a vehicle, and capable of shifting between a first state being a state in which the seat is frontward-oriented in a front-rear direction of the vehicle reversely rotatable in a front-rear direction of a vehicle and a second state being a state in which the seat is rearward-oriented in the front-rear direction of the vehicle. The pair of side airbags are expandable and deployable, and disposed in the seat on respective sides of the seat in a width direction of the vehicle. The seat state detector detects whether the seat is in the first state or the second state. The airbag deployment controller performs a deployment control of the pair of side airbags, on a condition that the seat state detector detects the rearward-oriented state of the seat. The airbag deployment controller performs a first deployment control to the pair of side airbags, on a condition that the seat state detector detects that the seat is in the first state, and performs a second deployment control to the pair of side airbags, on a condition that the seat state detector detects that the seat is in the second state. The second deployment control is in a reverse sequence from the fits deployment control.

The pair of side airbags may be substantially disposed in bilateral symmetry with respect to a center line in the width direction of the vehicle.

The pair of side airbags may be expandable and deployable so as to be identical in shape with each other.

A distance from a center of the seat in the width direction of the seat in the first state to an inner surface of a side wall of the vehicle may be equal to a distance from the center of the seat in the width direction of the seat in the second state to the inner surface of the side wall of the vehicle.

BRIEF DESCRIPTION OF THE DRAWINGS

FIG. 1A is a perspective view of a vehicle provided with an airbag unit according to an implementation of the technology.

FIG. 1B is a perspective view of the vehicle provided with the airbag unit according to the implementation of the technology.

DETAILED DESCRIPTION

Figure 2:
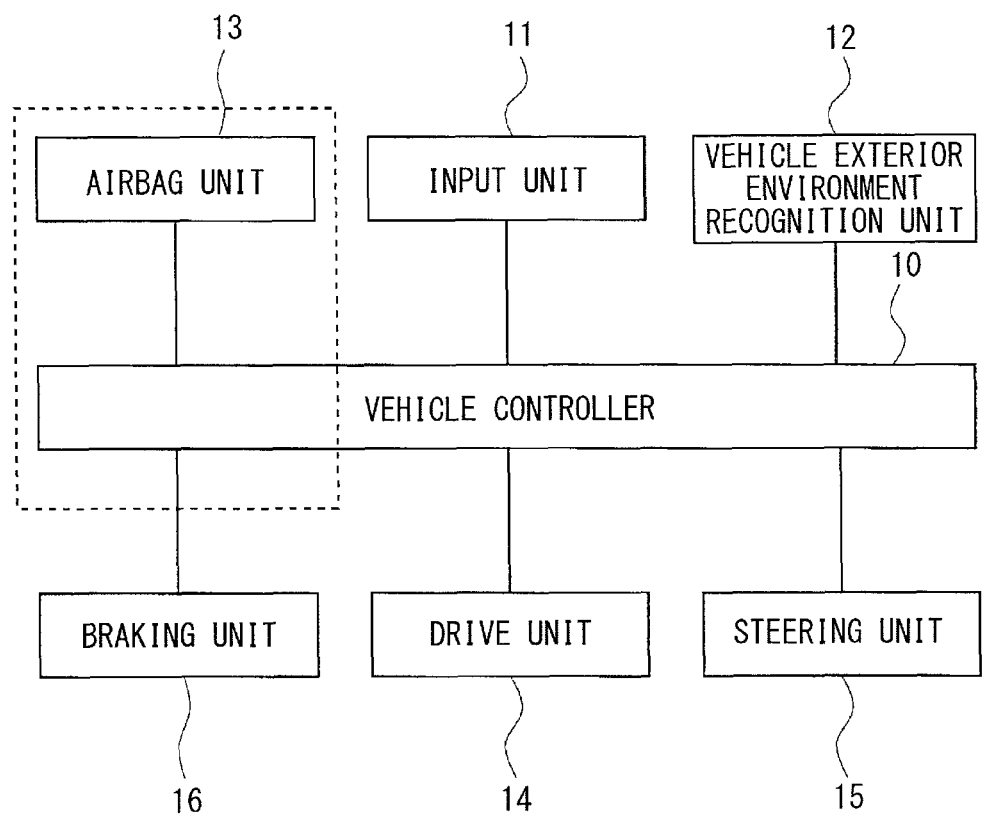
FIG. 2 is a block diagram that summarizes a control of the vehicle provided with the airbag unit according to an implementation of the technology.

In the following, some preferred implementations of the technology are described in detail with reference to the accompanying drawings. Note that in the following description of the implementations, the same members are denoted basically with the same reference numerals to avoid any redundant description.

FIGS. 1A and 1B are perspective views of an inside of a compartment of a vehicle 1 according to an implementation, as viewed from left frontward. FIG. 2 is a block diagram that summarizes a control of the vehicle 1 of the implementation.

Referring to FIG. 1A, the vehicle 1 may be a wagon type vehicle provided with three-row seats arranged in a front-rear direction of the vehicle 1. The vehicle 1 may include a driver's seat 2 on right side of a first row, a navigator's seat 3 on left side of the first row, a right seat 4 and a left seat 5 of a second row, and a right seat 6 and a left seat 7 of a third row. Referring to FIG. 1B, the vehicle 1 may have a function of automatic operation. For example, under a certain condition during the automatic operation, the vehicle 1 may run, with the driver's seat 2 and the navigator's seat 3 of the first row rotated 180° and faced with the right seat 4 and the left seat 5 of the second row.

Referring to FIG. 2, a vehicle controller 10 may be coupled to an input unit 11, a vehicle exterior environment recognition unit 12, an airbag unit 13, a drive unit 14 such as an engine, a steering unit 15 such as a steering wheel, a braking unit 16, and other undepicted control equipment including a notification unit (undepicted) such as a multi function display. The input unit 11 may include, for example, a push-button switch or a touch panel that may be operated by an occupant. The vehicle exterior environment recognition unit 12 may include, for example, a stereo camera or radar that may recognize exterior environment of the vehicle 1. The airbag unit 13 may provide protection for the occupant against impact in an event of, for example, a side collision of the vehicle 1. The drive unit 14 may serve as a power source that may allow the vehicle 1 to run. The steering unit 15 may be provided for steering of the vehicle 1. The braking unit 16 may perform deceleration and stopping of the vehicle 1.

The vehicle controller 10 may be, for example, an electronic control unit (ECU) that may include, for example, a central processing unit (CPU), read only memory (ROM), and random access memory (RAM), and execute processing such as various kinds of calculations for a vehicle control.

The vehicle controller 10 may switch manual operation and automatic operation, on a basis of an instruction from the input unit 11. The manual operation may be a normal operation mode in which a driver may perform driving operation, whereas the automatic operation may be an operation mode in which the vehicle controller 10 may automatically perform driving. During the automatic operation, the vehicle controller 10 may execute various kinds of calculation, on a basis of information supplied from the vehicle exterior environment recognition unit 12 and other units, and constantly monitor a current running state, the exterior environment, and other situations. The vehicle controller 10 may control the braking unit 16, the drive unit 14, and the steering unit 15, to perform appropriate automatic operation, in accordance with current situations. Thus, the vehicle controller 10 may have the function of the automatic operation, and automatically perform the driving operation of the vehicle 1.

The airbag unit 13 may include, as its principal components, a curtain bag, an inflator, and a housing box, for example. The inflator may supply gas to the curtain bag. The housing box may accommodate the curtain bag in a folded state and the inflator. Details of these components are described later. The airbag unit 13 may be controlled by the vehicle controller 10, and allow the curtain bag at a desired location to expand and deploy as appropriate, on a basis of signals from various collision sensors, to provide protection for the occupant against, for example, impact of a collision.

Note that the airbag unit 13 may be appropriately disposed at various locations in the vehicle 1, and include, for example, an airbag unit disposed at the steering wheel or an instrument panel, and a curtain airbag unit disposed on a roof side rail. In the following, description is given in detail of pairs of side airbag units that are disposed in the driver's seat 2 and the navigator's seat 3 on the first row, on right and left sides of the respective seats 2 and 3 in a width direction of the vehicle 1.

Figure 3A:
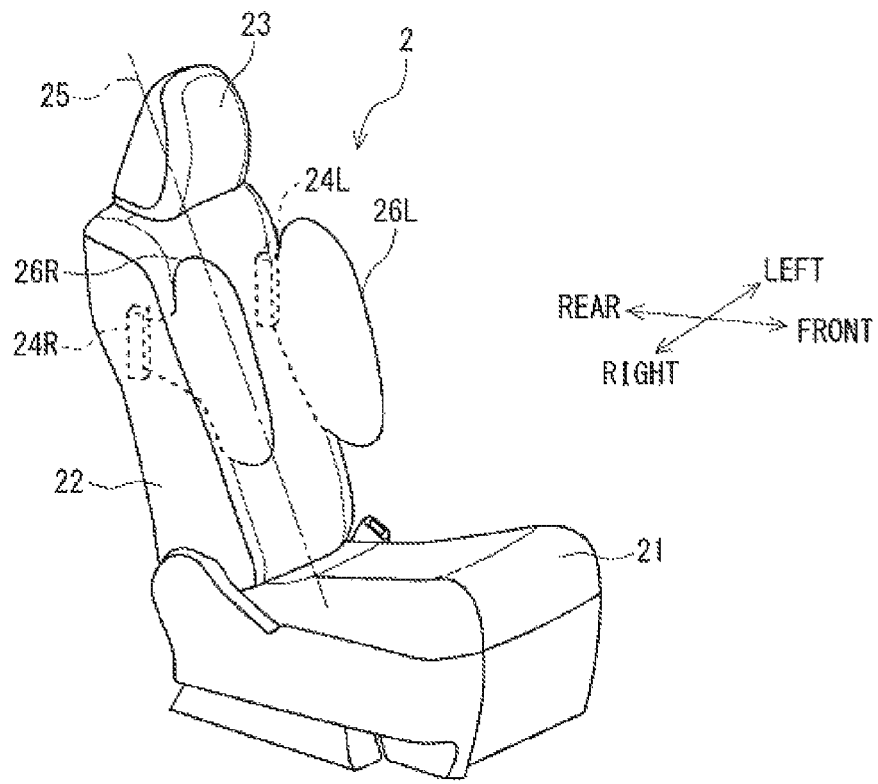
FIG. 3A is a perspective view of a seat provided with the airbag unit according to the implementation of the technology.
Figure 3B:
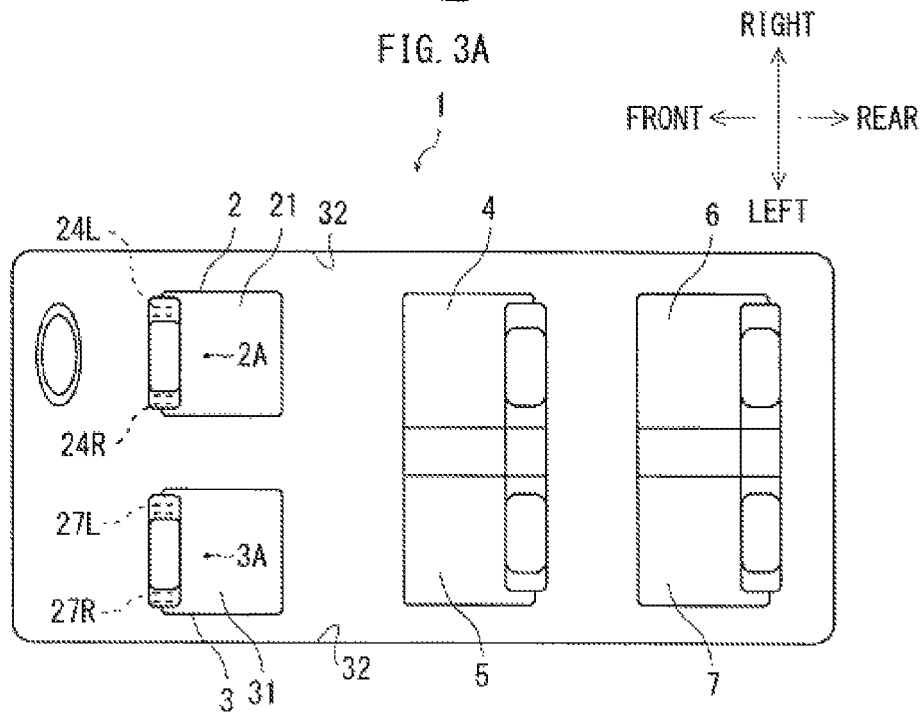
FIG. 3B is a schematic plan view of seating arrangement of the vehicle.

FIG. 3A is a perspective view of the driver's seat 2 of the vehicle 1 according to this implementation, as viewed from right frontward. FIG. 3B is a schematic plan view of seating arrangement of the vehicle. Note that the following description is given of a configuration of the driver's seat 2, but a configuration of the navigator's seat 3 may be similar to that of the driver's seat 2. The following description regarding the driver's seat 2 may therefore apply to the configuration of the navigator's seat 3, and description thereof is omitted here.

Referring to FIG. 3A, the driver's seat 2 may include a seat cushion 21, a backrest 22, and a headrest 23. The seat cushion 21 may be a part on which the occupant may be seated. The backrest 22 may extend upward from a rear part of the seat cushion 21, and support a back of the occupant. The headrest 23 may be disposed at an upper end of the backrest 22.

The seat cushion 21 may be movable along an undepicted slide rail. The slide rail may be disposed on, for example, a floor panel of the vehicle 1, and extend in the front-rear direction. This allows the seat cushion 21 to move manually or automatically in the front-rear direction. The backrest 22 may be supported, by an undepicted hinge mechanism, to be tiltable in the front-rear direction. The hinge mechanism may be disposed on, for example, the floor panel of the vehicle 1. This allows for adjustment of a tilting angle of the backrest 22.

The driver's seat 2 may be 180° reversely rotatable in a horizontal plane by, for example, an electric hydraulic device or an electric motor that may be disposed below the seat cushion 21. After being reversely rotated 180°, the driver's seat 2 may move manually or automatically along the slide rail as mentioned above.

As illustrated in the figures, a pair of side airbag units 24R and 24L may be disposed inside the backrest 22 of the driver's seat 2, on the right and left sides of the driver's seat 2. The side airbag unit 24R may be disposed inside the backrest 22, in vicinity of a side surface of the backrest 22 that may face an inner surface 32 of a side wall of the vehicle 1. The side airbag unit 24R may be disposed, for example, about 10 cm to 20 cm below from the upper end of the backrest 22. The side airbag unit 24L may be disposed inside the backrest 22, in vicinity of a side surface of the backrest 22 that may face the navigator's seat 3 of the vehicle 1. The side airbag unit 24L may be disposed, for example, about 10 cm to 20 cm below from the upper end of the backrest 22. In other words, the side airbags 24R and 24L may be disposed in bilateral symmetry in the width direction of the vehicle 1 with respect to a center line of the backrest 22 denoted by an alternate long and short dash line 25.

As described, the side airbag units 24R and 24L may respectively include curtain bags 26R and 26L. In one specific but non-limiting implementation, when the side collision on a right side surface of the vehicle 1 is detected, the curtain bag 26R may expand and deploy first, and thereafter, the curtain bag 26L may expand and deploy. The first expansion and deployment of the curtain bag 26R makes it possible to provide protection for the occupant against a collision of the occupant with the inner surface 32 of the side wall of the vehicle 1. The collision of the occupant with the inner surface 32 of the side wall of the vehicle 1 is considered to possibly cause severest damage to the occupant. The slightly delayed expansion and deployment of the curtain bag 26L makes it possible to prevent the occupants from colliding with one another.

As described later in detail, with the driver's seat 2 reversely rotated 180° in the horizontal plane, when the side collision on the right side surface of the vehicle 1 is detected, the curtain bag 26L may expand and deploy first. The curtain bag 26L may be disposed on side on which the inner surface 32 of the side wall of the vehicle 1 is disposed, with the driver's seat 2 rotated 180°. The curtain bags 26R and 26L may expand and deploy in identical shapes. The curtain bags 26R and 26L may expand and deploy at bilaterally symmetrical positions with respect to the center line 25 of the backrest 22 in the width direction, in lateral vicinity of the driver's seat 2. With this configuration, the curtain bag 26L may withstand a collision of the curtain bag 26L with the inner surface 32 of the side wall of the vehicle 1, as with the curtain bag 26R. This makes it possible to provide appropriate protection for the occupant against the collision of the occupant with the inner surface 32 of the side surface of the vehicle 1.

Referring to FIG. 3B, the navigator's seat 3 may include a pair of side airbag units 27R and 27L, as with the driver's seat 2. The pair of side airbag units 27R and 27L may be disposed inside the backrest 22, on the right and left sides of the navigator's seat 3 in the width direction of the vehicle 1. The driver's seat 2 may be, for example, 180° reversely rotatable in the front-rear direction, with a center 2A of the seat cushion 21 serving as an axis of rotation. Also, the navigator's seat 3 may be, for example, 180° reversely rotatable in the front-rear direction, with a center 3A of the seat cushion 31 serving as an axis of rotation. Note that in one alternative but non-limiting implementation, the driver's seat 2 and the navigator's seat 3 may be 180° reversely rotatable while being slidable inward of the vehicle 1, and positions of the centers 2A and 3A of the seat cushions 21 and 31 after the rotation may coincide with positions of the centers 2A and 3A of the seat cushions 21 and 31 before the rotation.

With this configuration, in the driver's seat 2, a distance from the center 2A of the seat cushion 21 to the inner surface 32 of the side wall of the vehicle 1 may be kept unchanged before and after the rotation. In the navigator's seat 3, a distance from the center 3A of the seat cushion 31 to the inner surface 32 of the side wall of the vehicle 1 may be kept unchanged before and after the rotation. In other words, the distance from the center 2A of the seat cushion 21 of the driver's seat 2 in a frontward-oriented state to the inner surface 32 of the side wall of the vehicle 1 may be equal to the distance from the center 2A of the seat cushion 21 of the driver's seat 2 in a rearward-oriented state to the inner surface 32 of the side wall of the vehicle 1. The distance from the center 3A of the seat cushion 31 of the navigator's seat 3 in the frontward-oriented state to the inner surface 32 of the side wall of the vehicle 1 may be equal to the distance from the center 3A of the seat cushion 31 of the navigator's seat 3 in the rearward-oriented state to the inner surface 32 of the side wall of the vehicle 1. The frontward-oriented state is a state in which the driver's seat 2 or the navigator's seat 3 is frontward-oriented in the front-rear direction, whereas the rearward-oriented state is a state in which the driver's seat 2 or the navigator's seat 3 is rearward-oriented in the front-rear direction. Accordingly, there is little change, before and after the rotation, in a distance from the occupant who is seated on the driver's seat 2 or the navigator's seat 3 to an undepicted curtain airbag unit. This makes it possible for the curtain airbag unit to provide appropriate protection for the head or other parts of the occupant.

Figure 4:
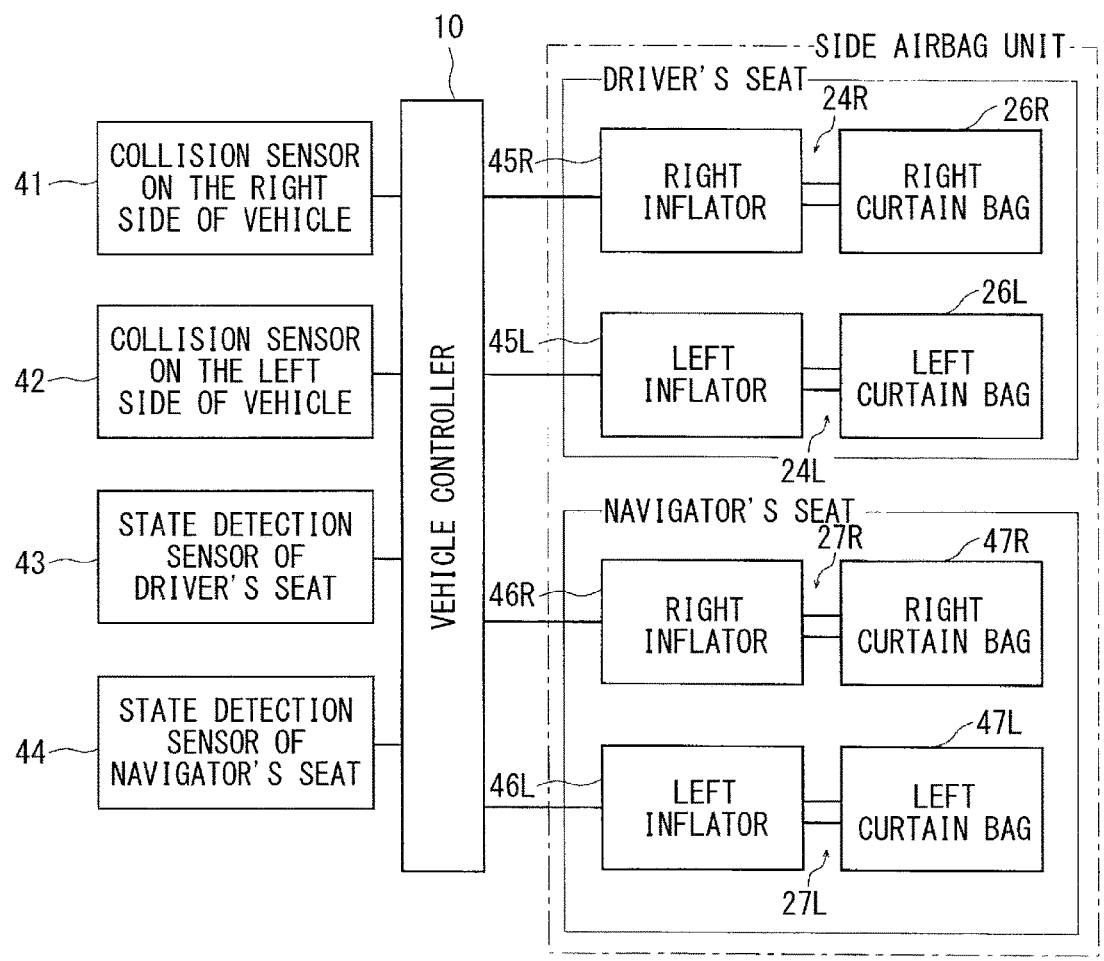
FIG. 4 is a block diagram that summarizes a control of the airbag unit according to the implementation of the technology.
Figure 5:
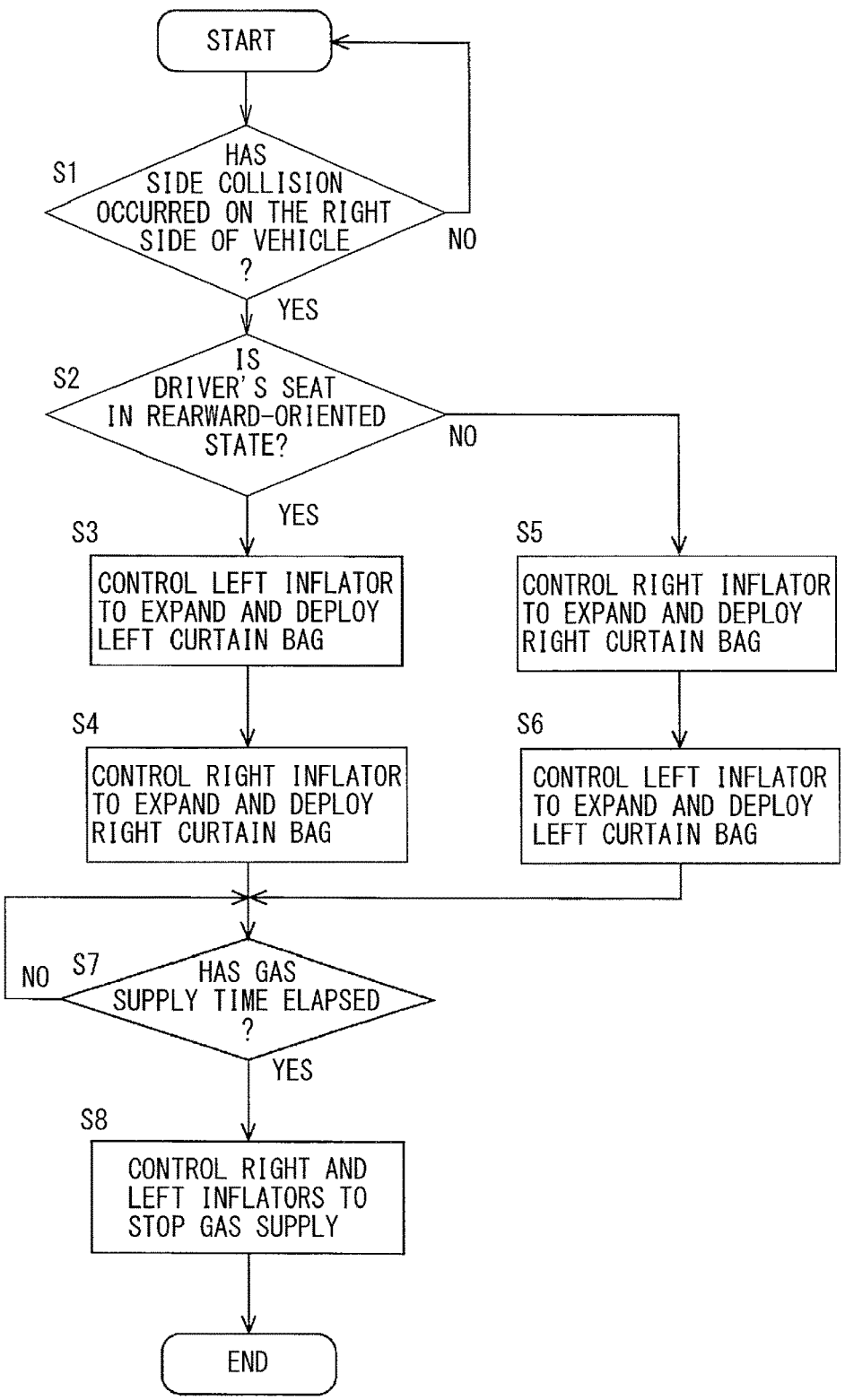
FIG. 5 is a flowchart that illustrates control operation of the airbag unit according to the implementation of the technology.
Figure 6:
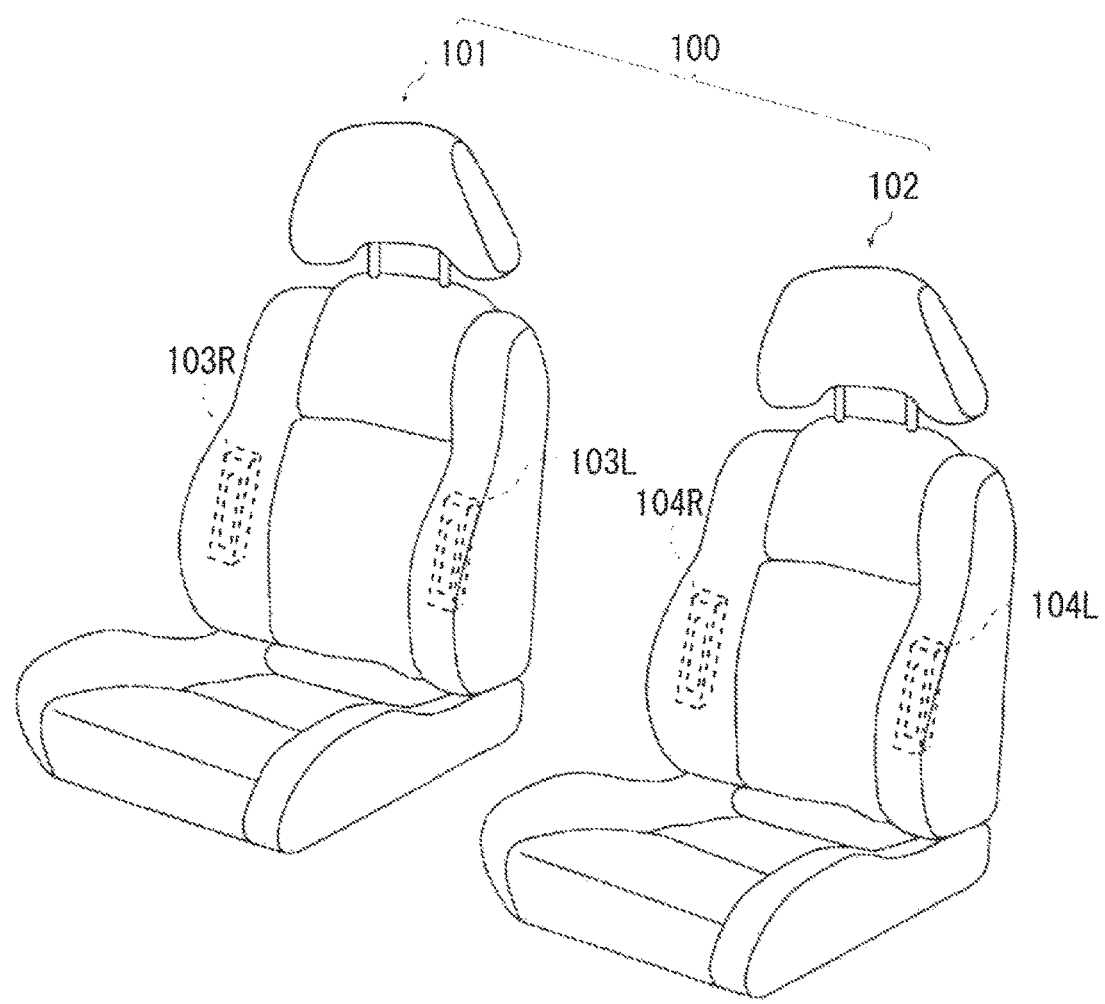
FIG. 6 is a perspective view of seats of a vehicle, the seats being provided with existing airbag units.

FIG. 4 is a block diagram that summarizes a control of the side airbag units 24R, 24L, 27R, and 27L of the driver's seat 2 and the navigator's seat 3. FIG. 5 is a flowchart that illustrates control operation of the side airbag units 24R, 24L, 27R, and 27L of the driver's seat 2 and the navigator's seat 3. Note that FIGS. 4 and 5 illustrate solely the side airbag units 24R, 24L, 27R, and 27L out of the airbag units included in the airbag unit 13 denoted by the broken line in FIG. 2.

Referring to FIG. 4, the side airbag units 24R, 24L, 27R, and 27L may be controlled by the vehicle controller 10. To the vehicle controller 10, the following may be coupled: a vehicle right-side collision sensor 41; a vehicle left-side collision sensor 42; a driver's-seat state detection sensor 43; a navigator's-seat state detection sensor 44; a right inflator 45R and a left inflator 45L of the driver's seat 2; and a right inflator 46R and a left inflator 46L of the navigator's seat 3. The vehicle right-side collision sensor 41 may detect the side collision on the right side surface of the vehicle 1. The vehicle left-side collision sensor 42 may detect the side collision on a left side surface of the vehicle 1. The driver's-seat state detection sensor 43 may detect a rotated position of the driver's seat 2. The navigator's-seat state detection sensor 44 may detect a rotated position of the navigator's seat 3.

Note that the driver's-seat state detection sensor 43 and the navigator's-seat state detection sensor 44 may detect, with use of, for example, a rotation angle sensor, which direction the driver's seat 2 and the navigator's seat 3 are oriented, frontward or rearward, in the front-rear direction of the vehicle 1. In one alternative but non-limiting implementation, the driver's-seat state detection sensor 43 and the navigator's-seat state detection sensor 44 may detect, with use of, for example, an on-vehicle camera, which direction the driver's seat 2 and the navigator's seat 3 are oriented, frontward or rearward, in the front-rear direction of the vehicle 1.

In a case in which the driver's seat 2 is frontward-oriented in the front-rear direction of the vehicle 1, when the vehicle right-side collision sensor 41 detects the side collision on the right side surface of the vehicle 1, the vehicle controller 10 may control the right inflator 45R of the driver's seat 2 to supply the gas to the right curtain bag 26R, to allow the curtain bag 26R to expand and deploy. After controlling the right inflator 45R, the vehicle controller 10 may immediately control the left inflator 45L of the driver's seat 2 to supply the gas to the left curtain bag 26L, to allow the curtain bag 26L to expand and deploy.

Similarly, in a case in which the navigator's seat 3 is frontward-oriented in the front-rear direction of the vehicle 1, when the vehicle left-side collision sensor 42 detects the side collision on the left side surface of the vehicle 1, the vehicle controller 10 may control the left inflator 46L of the navigator's seat 3 to supply the gas to the left curtain bag 47L, to allow the curtain bag 47L to expand and deploy. After controlling the left inflator 46L, the vehicle controller 10 may immediately control the right inflator 46R of the navigator's seat 3 to supply the gas to the right curtain bag 47R, to allow the curtain bag 47R to expand and deploy.

Meanwhile, in a case in which the driver's seat 2 is rearward-oriented in the front-rear direction of the vehicle 1, when the vehicle right-side collision sensor 41 detects the side collision on the right side surface of the vehicle 1, and when the driver's-seat state detection sensor 43 detects the driver's seat 2 being rotated rearward of the vehicle 1, the vehicle controller 10 may control the left inflator 45L of the driver's seat 2 to supply the gas to the left curtain bag 26L, to allow the curtain bag 26L to expand and deploy. After controlling the left inflator 45L, the vehicle controller 10 may immediately control the right inflator 45R of the driver's seat 2 to supply the gas to the right curtain bag 26R, to allow the curtain bag 26R to expand and deploy.

Similarly, in a case in which the navigator's seat 3 is rearward-oriented in the front-rear direction of the vehicle 1, when the vehicle left-side collision sensor 42 detects the side collision on the left side surface of the vehicle 1, and when the navigator's-seat state detection sensor 44 detects the navigator's seat 3 being rotated rearward of the vehicle 1, the vehicle controller 10 may control the right inflator 46R of the navigator's seat 3 to supply the gas to the right curtain bag 47R, to allow the curtain bag 47R to expand and deploy. After controlling the right inflator 46R, the vehicle controller 10 may immediately control the left inflator 46L of the navigator's seat 3 to supply the gas to the left curtain bag 47L, to allow the curtain bag 47L to expand and deploy.

As described, in a case in which the driver's seat 2 or the navigator's seat 3 is rearward-oriented in the front-rear direction of the vehicle 1, the vehicle controller 10 may perform a deployment control of the side airbag units 24R, 24L, 27R, and 27L in a reverse sequence from a deployment control in a case in which the driver's seat 2 or the navigator's seat 3 is frontward-oriented in the front-rear direction of the vehicle 1. This method of the deployment control allows for priority expansion and deployment of the side airbag units 24R, 24L, 27R, and 27L on side on which the inner surface 32 of the side wall of the vehicle 1 is disposed with respect to the driver's seat 2 or the navigator's seat 3 (refer to FIG. 3B), when the side collision occurs to the vehicle 1. It is therefore possible to provide appropriate protection for the occupant against the collision of the occupant with the inner surface 32 of the side wall of the vehicle 1. The collision of the occupant with the inner surface 32 of the side wall of the vehicle 1 is considered to possibly cause the severest damage to the occupant.

FIG. 5 is a flowchart that illustrates the control operation of the side airbag units 24R and 24L of the driver's seat 2 in the case in which the side collision occurs to the right side surface of the vehicle 1. Note that a similar flowchart may be provided regarding the control operation of the side airbag units 27R and 27L of the navigator's seat 3, in the case in which the side collision occurs to the left side surface of the vehicle 1. In the flowchart, as with the case of the driver's seat 2, the side airbag unit 27R or 27L on side on which the inner surface 32 of the side wall of the vehicle 1 is disposed may expand and deploy first, in accordance with the orientation of the navigator's seat 3. The following description regarding the control operation of the driver's seat 2 may therefore apply to the control operation of the navigator's seat 3, and description thereof is omitted.

In step S1, the vehicle controller 10 may detect, with the vehicle right-side collision sensor 41, the occurrence of the side collision to the right side surface of the vehicle 1. When the vehicle controller 10 detects, with the vehicle right-side collision sensor 41, the occurrence of the side collision to the right side surface of the vehicle 1 (YES in step S1), the flow may proceed to step S2. In step S2, the vehicle controller 10 may detect, with the driver's-seat state detection sensor 43, the rearward-oriented state of the driver's seat 2 in the front-rear direction of the vehicle 1. Meanwhile, when the vehicle controller 10 detects no occurrence of the side collision to the right side surface of the vehicle 1 (NO in step S1), the flow may return to step S 1, and the vehicle controller 10 may repeat the detection of the occurrence of the side collision to the right side surface of the vehicle 1, with the vehicle right-side collision sensor 41.

When the vehicle controller 10 detects, with the driver's-seat state detection sensor 43, the rearward-oriented state of the driver's seat 2 in the front-rear direction of the vehicle 1 (YES in step S2), the flow may proceed to step S3. In step S3, the vehicle controller 10 may control the left inflator 45L of the driver's seat 2 to supply the gas to the left curtain bag 26L, to allow the curtain bag 26L to expand and deploy. Immediately thereafter, the flow may proceed to step S4, in which the vehicle controller 10 may control the right inflator 45R of the driver's seat 2 to supply the gas to the right curtain bag 26R, to allow the curtain bag 26R to expand and deploy.

Meanwhile, when the vehicle controller 10 detects, with the driver's-seat state detection sensor 43, no rearward-oriented state of the driver's seat 2 in the front-rear direction of the vehicle 1 (NO in step S2), the flow may proceed to step S5. In step S5, the vehicle controller 10 may control the right inflator 45R of the driver's seat 2 to supply the gas to the right curtain bag 26R, to allow the curtain bag 26R to expand and deploy. Immediately thereafter, the flow may proceed to step S6, in which the vehicle controller 10 may control the left inflator 45L of the driver's seat 2 to supply the gas to the left curtain bag 26L, to allow the curtain bag 26R to expand and deploy.

Thereafter, in step S7, the vehicle controller 10 may determine whether or not predetermined gas supply time has elapsed since a start of the expansion and deployment of the left curtain bag 26L and the right curtain bag 26R. When the vehicle controller 10 determines the elapse of the predetermined gas supply time (YES in step S7), the flow may proceed to step S8. In step S8, the vehicle controller 10 may control the right and left inflators 45R and 45L of the driver's seat 2 to stop the gas supply to the curtain bags 26R and 26L. Meanwhile, when the vehicle controller 10 determines that the predetermined gas supply time has not elapsed, the flow may return to step S7, and the vehicle controller 10 may repeat the determination on whether or not the predetermined gas supply time has elapsed.

Note that in this implementation, description is given on a case in which the side airbag units 24R and 24L of the driver's seat 2 may expand and deploy as appropriate upon the occurrence of the side collision to the right side surface of the vehicle 1, whereas the side airbag units 27R and 27L of the navigator's seat 3 may expand and deploy as appropriate upon the occurrence of the side collision to the left side surface of the vehicle 1. Implementations of the technology, however, are not limited to this case. In one alternative but non-limiting implementation, the side airbag units 27R and 27L of the navigator's seat 3 may also expand and deploy upon the occurrence of the side collision to the right side surface of the vehicle 1. In this case, the occupant seated on the navigator's seat 3 may fall first toward the driver's seat 2 upon the occurrence of the side collision to the right side surface of the vehicle 1. Accordingly, in the navigator's seat 3, the vehicle controller 10 may perform the control to selectively cause the expansion and deployment of relevant one of the side airbag units 27R and 27L positioned on the side on which the driver's seat 2 is disposed, depending on which direction the navigator's seat 3 is oriented, frontward or rearward, in the front-rear direction of the vehicle 1, prior to the expansion and deployment of another one of the side airbag units 27R and 27L positioned on opposite side to the driver's seat 2. In another alternative but non-limiting implementation, the side airbag units 24R and 24L of the driver's seat 2 may also expand and deploy upon the occurrence of the side collision to the left side surface of the vehicle 1. In this case, similarly, in the driver's seat 2, the vehicle controller 10 may perform the control to selectively cause the expansion and deployment of relevant one of the side airbag units 24R and 24L positioned on the side on which the navigator's seat 3 is disposed, depending on which direction the driver's seat 2 is oriented, frontward or rearward, in the front-rear direction of the vehicle 1, prior to the expansion and deployment of another one of the side airbag units 24R and 24L positioned on opposite side to the navigator's seat 3.

Moreover, in this implementation, description is given on a case in which the driver's seat 2 and the navigator's seat 3 are frontward-oriented in the front-rear direction of the vehicle 1, i.e., normally-oriented during the manual operation, or a case in which the driver's seat 2 and the navigator's seat 3 are rotated 180° in the horizontal plane from the frontward orientation to be rearward-oriented in the front-rear direction of the vehicle 1. Implementations of the technology, however, are not limited to these cases. In one alternative but non-limiting implementation, the vehicle controller 10 may detect the frontward-oriented state of the driver's seat 2 and the navigator's seat 3 in the front-rear direction of the vehicle 1, when the driver's seat 2 and the navigator's seat 3 are rotated 90° in the horizontal plane or less from the frontward orientation in the front-rear direction of the vehicle 1, i.e., normal orientation during the manual operation. The vehicle controller 10 may detect the rearward-oriented state of the driver's seat 2 or the navigator's seat 3 in the front-rear direction of the vehicle 1, when the driver's seat 2 or the navigator's seat 3 is rotated 90° in the horizontal plane or more from the frontward orientation in the front-rear direction of the vehicle 1, i.e., the normal orientation during the manual operation. The expansion and deployment of the side airbag units 24R, 24L, 27R, and 27L may be performed on the basis of the control flow as described above. Other modifications may be made in variety of ways without departing from the scope of the technology.

According to the airbag unit of the implementations of the technology, the pair of side airbags are incorporated in the seat that is reversely rotatable in the front-rear direction of the vehicle. The sequence of the expansion and deployment of the pair of side airbags is appropriately controlled in accordance with the orientation of the seat in the front-rear direction of the vehicle. With this configuration, the side airbag expands and deploys first that is incorporated in the seat and located on the side of the vehicle on which the inner surface of the side wall of the vehicle is disposed. Hence, it is possible to provide appropriate protection for the occupant against the collision of the occupant with the inner surface of the side wall of the vehicle. The collision of the occupant with the inner surface of the side wall of the vehicle is considered to possibly cause severest damage to the occupant.

Moreover, the pair of side airbags may be incorporated inside the backrest of the seat. The pair of side airbags may be disposed in the bilateral symmetry with respect to the center line of the backrest of the seat in the width direction of the vehicle. With this configuration, the side airbag that expands and deploys toward the inner surface of the side wall of the vehicle is positioned at the same position as in a case in which the seat is frontward-oriented in the front-rear direction of the vehicle, even when the seat is rearward-oriented in the front-rear direction of the vehicle. Hence, it is possible to provide appropriate protection for the occupant.

Furthermore, the pair of side airbags may be expansive and deployable in the identical shapes. Hence, it is possible to provide appropriate protection for the occupant, with the side airbags that are expansive and deployable toward the inner surface of the side wall of the vehicle, even when the seat is rearward-oriented in the front-rear direction of the vehicle.

Moreover, the distance from the center of the seat cushion of the seat in the frontward-oriented state to the inner surface of the side wall of the vehicle may be equal to the distance from the center of the seat cushion of the seat in the rearward-oriented state to the inner surface of the side wall of the vehicle. This allows the position of the seat cushion in the case in which the seat is rearward-oriented in the front-rear direction of the vehicle to be the same as the position of the seat cushion in the case in which the seat is frontward-oriented in the front-rear direction of the vehicle. With this configuration, there is little change in the distance from the occupant seated on the seat to the curtain airbag, even when the seat is rearward-oriented in the front-rear direction of the vehicle. Hence, it is possible to provide appropriate protection for the head of the occupant.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims.

The technology is intended to include such modifications and alterations in so far as they fall within the scope of the appended claims or the equivalents thereof.

The invention claimed is:

1. An airbag unit, comprising:
    at least one seat that is to be disposed in a vehicle, and capable of shifting between a first state being a state in which the seat is frontward-oriented in a front-rear direction of the vehicle and a second state being a state in which the seat is rearward-oriented in the front-rear direction of the vehicle;
    a pair of side airbags that are expandable and deployable, and disposed in the seat on respective sides of the seat in a width direction of the vehicle;
    a seat state detector that detects whether the seat is in the first state or the second state; and
    an airbag deployment controller that performs a first deployment control to the pair of side airbags, on a condition that the seat state detector detects that the seat is in the first state, and performs a second deployment control to the pair of side airbags, on a condition that the seat state detector detects that the seat is in the second state, the second deployment control being in a reverse sequence from the first deployment control,
    wherein the vehicle comprises a vehicle side collision sensor, and the seat state detector detects whether the seat is in the first or second state after the vehicle side collision sensor detects a vehicle side collision.

2. The airbag unit according to claim 1, wherein
    the pair of side airbags are disposed substantially in bilateral symmetry with respect to a center line in the width direction of the vehicle.

3. The airbag unit according to claim 2, wherein
    the pair of side airbags are expandable and deployable so as to be identical in shape with each other.

4. The airbag unit according to claim 1, wherein
    a distance from a center of the seat in the width direction of the seat in the first state to an inner surface of a side wall of the vehicle is equal to a distance from the center of the seat in the width direction of the seat in the second state to the inner surface of the side wall of the vehicle.

5. The airbag unit according to claim 2, wherein
    a distance from a center of the seat in the width direction of the seat in the first state to an inner surface of a side wall of the vehicle is equal to a distance from the center of the seat in the width direction of the seat in the second state to the inner surface of the side wall of the vehicle.

6. The airbag unit according to claim 3, wherein
    a distance from a center of the seat in the width direction of the seat in the first state to an inner surface of a side wall of the vehicle is equal to a distance from the center of the seat in the width direction of the seat in the second state to the inner surface of the side wall of the vehicle.

7. The airbag unit according to claim 1, wherein the first deployment control comprises:
    deploying a first side airbag of the pair of side airbags; and
    after the deploying of the first side airbag, deploying a second side airbag of the pair of side airbags.

8. The airbag unit according to claim 7, wherein the second deployment control comprises:
    deploying the second side airbag of the pair of side airbags; and
    after the deploying of the second side airbag, deploying the first side airbag of the pair of side airbags.

9. The airbag unit according to claim 1, wherein the seat state detector comprises one of a rotation angle sensor and an on-vehicle camera.

10. The airbag unit according to claim 1, wherein the pair of side airbags comprises first and second side airbags,
    wherein if the seat is in the first state then the first side airbag is deployed toward an inner surface of a side wall of the vehicle, and if the seat is in the second state then the second side airbag is deployed toward the inner surface of the side wall of the vehicle, and
    wherein a position at which the first side airbag is deployed in the first state is the same as a position at which the second side airbag is deployed in the second state.

11. The airbag unit according to claim 1, wherein the airbag deployment controller comprises a vehicle controller which switches the vehicle between manual operation and automatic operation, and
    wherein the vehicle controller is connected to an input unit for inputting an instruction to switch between the manual operation and the automatic operation.

12. The airbag unit according to claim 1, wherein the seat comprises a seat cushion, and a backrest extending upward from the seat cushion, and
    wherein the pair of side airbags comprises:
        a first side airbag disposed inside a first side surface of the backrest that faces an inner surface of a side wall of the vehicle when the seat is in the first state; and
        a second side airbag disposed inside a second side surface of the backrest that faces the inner surface of the side wall of the vehicle when the seat is in the second state.

13. The airbag unit according to claim 12, wherein a center of the seat cushion serves as an axis of rotation for rotating the seat between the first state and the second state.

14. An airbag system, comprising:
    a seat that is rotatable to be in a first state in which the seat is oriented in a first direction, and a second state in which the seat is oriented in a second direction;
    a plurality of airbags that are disposed in the seat;
    a vehicle side collision sensor which detects a vehicle side collision;
    a seat state detector that, after the vehicle side collision sensor detects a vehicle side collision, detects whether the seat is in the first state or the second state; and
    a controller that deploys the plurality of airbags in a first sequence if the seat state detector detects that the seat is in the first state, and deploys the plurality of airbags in a second sequence different from the first sequence if the seat state detector detects that the seat is in the second state.

15. The airbag system of claim 14, wherein the second sequence is a reverse sequence from the first sequence.

16. The airbag system of claim 15, wherein the plurality of airbags comprises a pair of side airbags that are formed on respective sides of the seat in a width direction.

17. The airbag system of claim 14, wherein the seat comprises a vehicle seat for a vehicle,
    wherein in the first state, the seat is frontward-oriented in a front-rear direction of the vehicle, and
    wherein in the second state, the seat is rearward-oriented in the front-rear direction of the vehicle.

18. An airbag system, comprising:
    a first plurality of airbags that are disposed in a first seat, the first seat being rotatable to be in a first state in which the first seat is oriented in a first direction, and a second state in which the first seat is oriented in a second direction;

a second plurality of airbags that are disposed in a second seat, the second seat being rotatable to be in a first state in which the second seat is oriented in the first direction, and a second state in which the second seat is oriented in the second direction;

a vehicle side collision sensor that detects a vehicle side collision;

a seat state detector that, after the vehicle side collision sensor detects a vehicle side collision:
  detects whether the first seat is in the first state or the second state; and
  detects whether the second seat is in the first state or the second state; and a controller that:
  deploys the first plurality of airbags in a first sequence if the seat state detector detects that the first seat is in the first state, and deploys the first plurality of airbags in a second sequence different from the first sequence if the seat state detector detects that the first seat is in the second state; and
  deploys the second plurality of airbags in the first sequence if the seat state detector detects that the second seat is in the first state, and deploys the second plurality of airbags in the second sequence if the seat state detector detects that the second seat is in the second state.

* * * * *